United States Patent [19]

Taylor

[11] 4,405,102
[45] Sep. 20, 1983

[54] VARIABLE WING POSITION SUPERSONIC BIPLANE

[75] Inventor: Robert M. Taylor, Vienna, Va.

[73] Assignee: The United States of America as represented by the Secretary of the Navy, Washington, D.C.

[21] Appl. No.: 323,525

[22] Filed: Nov. 20, 1981

[51] Int. Cl.³ .......................... B64C 3/38; B64C 39/08
[52] U.S. Cl. ............................... 244/45 R; 244/35 A; 244/46
[58] Field of Search .................... 244/45 R, 35 A, 46, 244/48, 216, 218

[56] References Cited

U.S. PATENT DOCUMENTS

| | | | |
|---|---|---|---|
| 1,589,780 | 6/1926 | Wragg | 244/48 |
| 2,007,319 | 7/1935 | Wurth | 244/46 |
| 2,576,294 | 11/1951 | Geraci | 244/45 R |
| 3,371,888 | 3/1968 | Alvarez-Calderon | 244/216 |
| 4,090,681 | 5/1978 | Zimmer | 244/45 R |

OTHER PUBLICATIONS

Paul Dennis Coronel, "The Coronel Transverse Wing Flight System", *AIAA Student Journal*, Summer, 1980, pp. 38-41, 47.
Paul Dennis Coronel, "The Coronel C-1 Transverse Wing Experimental Aircraft", *Model Aviation*, May, 1980, pp. 63-68, 121-122.

*Primary Examiner*—Trygve M. Blix
*Assistant Examiner*—Ivy M. Shum
*Attorney, Agent, or Firm*—R. F. Beers; L. A. Marsh

[57] ABSTRACT

A wing structure for an aircraft designed for both STOL and supersonic flight conditions includes a biplanar wing arrangement in which the lower wing section is staggered behind the upper wing section and the lower wing section is designed for both translational and rotational displacements relative to the upper wing section. For short takeoff and landing capabilities, the lower wing section is rotated and translated relative to the upper wing section so that the leading edge of the lower wing section is adjacent to the trailing edge of the upper wing section. For high speed supersonic flight, the lower wing section is adjacent to the trailing edge of the upper wing section. For high speed supersonic flight, the lower wing section is rotated and translated relative to the upper wing section so that the wing sections are substantially parallel.

4 Claims, 9 Drawing Figures

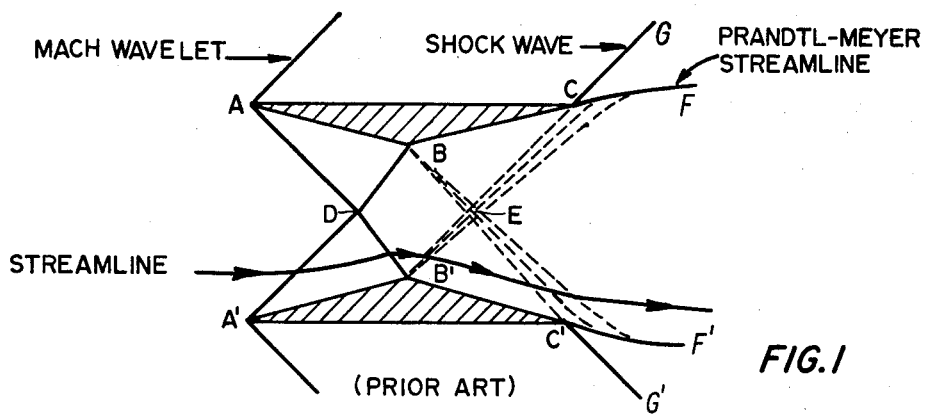
FIG. 1
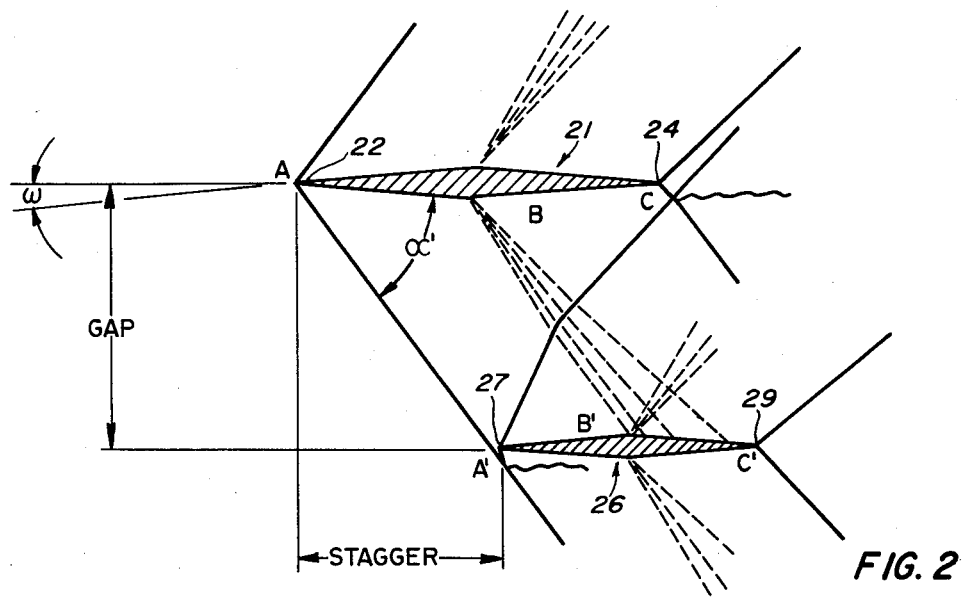
FIG. 2
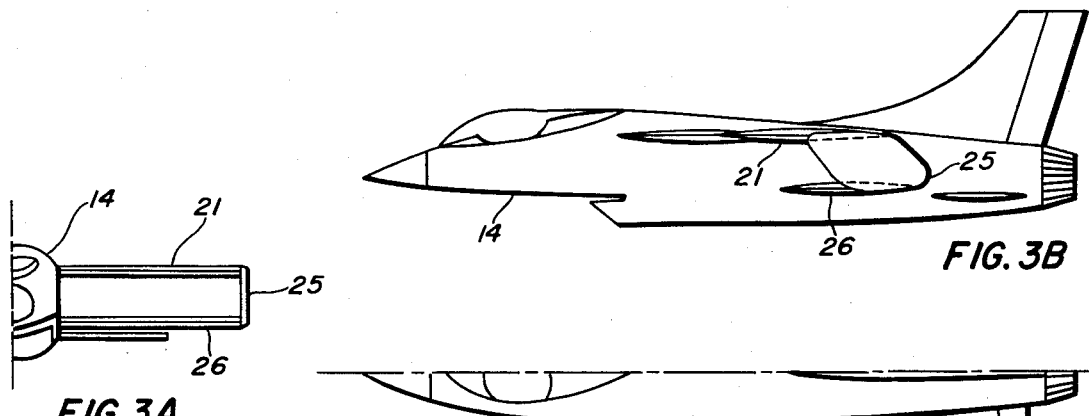
FIG. 3A
FIG. 3B
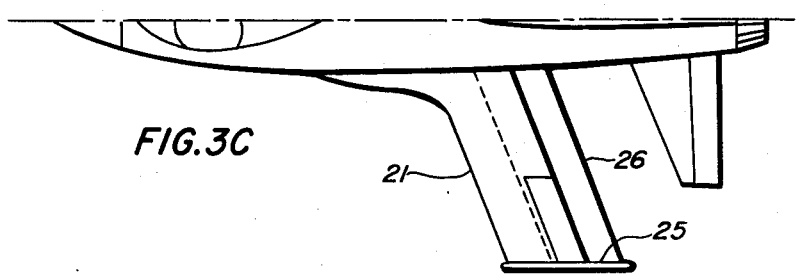
FIG. 3C

VARIABLE WING POSITION SUPERSONIC BIPLANE

The present invention generally relates to a variable wing position aircraft and, more particularly, to an aircraft capable of both STOL (Short Takeoff and Landing) performance and high efficiency supersonic flight.

With the advent of aircraft carriers there have been continuing efforts to develop aircraft wing structures capable of providing sufficient lift for the airplane to takeoff/land at the lowest possible speed and also permit high speed, supersonic flight with reduced drag while airborne. At slower takeoff and landing speeds the wing is relied upon to produce maximum lift, which is often accompanied with high drag forces, so that the airplane can takeoff and land in as short as space as possible. However, at higher, supersonic flight speeds the wing configurations proposed for efficient takeoffs and landings produce high drag forces that oppose efficient high speed flight. For example, while large, thick wings have been developed to enable an airplane to land and takeoff in a safe manner, the wing sections produce accompanying drag forces that preclude high speed, supersonic flight. Conversely, while small thin wing structures have been developed for supersonic flight, aircraft provided with such wing structures normally require rather long runways for takeoffs and landings. Various wing arrangements have been developed in an attempt to combine the advantages of high lift forces produced by subsonic wing designs and the reduced drag, high speed flight capabilities of the supersonic wing designs. For example, wing structures have been designed which incorporate various leading and trailing edge flaps, such as retractable "Fowler" type flaps, to increase the effective length and camber of the airfoil when high lift forces are required. However, the flap mechanisms and supporting structure therefore are often difficult to incorporate into thin supersonic wing structures. Another means for controlling the lift/drag forces produced by an airfoil is the Circulation Control Wing (CCW). The basic aerodynamics of the circulation control concept involve the adherence of a thin, tangentially ejected jet sheet to the rounded trailing edge of an otherwise conventional aircraft. This phenomenon, frequently identified as the Coanda effect is produced by a balance within the jet sheet between centrifugal force and the low static pressure produced by the jet velocity. This device initially acts as a boundary layer control and it achieves high-lift capability by control of the airfoil stagnation points and thus the circulation around it. Due to the lack of a sharp trailing edge and the associated Kutta condition, this circulation control is achieved at considerably lower momentum coefficients than produced with a tangential blow flap. Thus, the primary mechanism of the CCW wing is the increased streamline deflection that accompanies movement of the stagnation points, with the overall result being the production of an effective camber considerably greater than the geometric value.

Another objective for modern military aircraft, such as those used aboard aircraft carriers, is to improve the cruise speed of the aircraft. A major impediment in this effort is aircraft drag. One proposed means for reducing drag effects during high speed flight is a wing design referred to as the "Busemann" biplane wing arrangement, which comprises spaced wing sections of triangularly shaped cross sections that are arranged so that the vertices of the triangles are directed toward each other. Thus, the upper wing section has an inverted triangular cross section with the smallest gap between the spaced wing sections occurring between the vertices of the triangular wing sections. While theoretical calculations have proposed that the supersonic flow field around the wing sections causes a beneficial interference therebetween with accompanying drag reduction, actual experience has demonstrated that the rear half of the flow field has a Prandtl-Meyer expansion fan rather than a single expansion wave. This produces undesirable friction and drag forces. Another biplanar wing arrangement, the "Diamond Box Wing", is set forth in U.S. Pat. No. 4,090,681. This wing structure includes two spaced upper and lower sweptback wings that converge together at the distal end portions to form a closed frame. The upper wing, which is joined to the fuselage forward of the lower wing, is more sweptback than the lower wing and the upper wing section has an inverted-V front profile.

SUMMARY OF THE INVENTION

The invention overcomes various performance drawbacks encountered with the prior art by providing a variable position wing structure designed for both STOL and supersonic flight conditions. This is accomplished by utilizing a biplanar wing arrangement in which the lower wing section is designed for both translation and rotation relative to the upper wing to assume a desired flight configuration. The lower wing section is staggered behind the upper wing section so that, upon rotation and translation of the lower wing section, the leading edge portion of the lower wing section is positioned adjacent to the trailing edge portion of the upper wing section. This configuration enables the aircraft to perform with short takeoff and landing capabilities. For high speed supersonic flight, the lower wing section is rotated and translated relative to the upper wing section so that the wing sections are substantially parallel with each other.

Accordingly, one object of the present invention is to provide a variable position wing structure which exhibits high efficiency flight performance in both STOL and supersonic flight configurations.

Another object of this invention is the provision of a supersonic wing configuration which is not susceptible to choking of the air flow therebetween and which is capable of "swallowing" the supersonic shock wave occurring between the wing sections.

A further object of the invention is to provide a variable position wing structure designed to undergo both translation and rotational displacements to assume a selected wing position.

BRIEF DESCRIPTION OF THE DRAWINGS

The novel features which are believed to be characteristic of this invention are set forth with particularity in the appended claims. The invention itself, however, both as to its organization and the method disclosed herein, together with further objects and advantages thereof, may be best understood by reference to the accompanying drawings, in which:

FIG. 1 is a cross-sectional view of a prior art type of wing arrangement;

FIG. 2 is a cross-sectional view of a wing arrangement according to the present invention;

FIGS. 3A–3C are different views of an aircraft provided with the wing arrangement of the present invention;

DETAILED DESCRIPTION OF THE DRAWINGS

Figure 4:
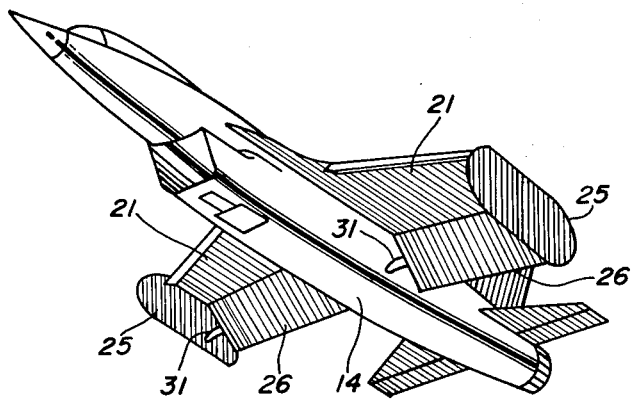
FIG. 4 is a perspective view of the aircraft of FIGS. 3 with the lower wing displaced to assume a STOL configuration.

Referring now to the drawings and to FIG. 1 in particular there is shown a prior art type of biplanar wing arrangement referred to as the Busemann Biplane. The overlapping Busemann wing sections, represented by triangles ABC and A'B'C' in a supersonic flow field, are arranged to create a beneficial interference therebetween to produce a resultant drag reduction. Drag reduction results from the cancellation of shock waves occurring between the spaced wing sections. More specifically, compression waves ADB' and A'DB intersect and are deflected so that they impinge at the triangle vertices B' and B respectively, where they are cancelled by boundaries BC and B'C' turning away from the flow. The wing structure was designed on the assumption that the expansion waves BEC' and B'EC intersect at E and impinge on the wings at points C' and C respectively so that they are cancelled as they see the free stream as a boundary. In actuality, however, while the front half of the shock wave behaves as described above, the rear half of the shock wave really has a Prandtl-Meyer expansion fan rather than a single expansion wave. This makes it impossible for an expansion wave to contact the trailing edge of the opposite wing section so that the flow will begin to turn at the trailing edge and not be parallel with the free stream flow until some distance behind the trailing edge of the wing sections. This produces a flow field disturbance in the form of shock waves CG, C'G' and accompanying friction along the Prandtl-Meyer streamlines CF and C'F'.

FIG. 2 represents a cross-sectional view of the overlapping biplanar wing arrangement of the present invention in which the upper wing section 21 is positioned in front of the lower wing section 26. The proper vertical distance between the biplanar wing sections, referred to as the "gap" is a function of the critical area ratio (A*/A) and the Mach number. The critical area ratio is set forth as follows:

$$\frac{A^*}{A} = \frac{\text{Critical Area}}{\text{Inlet Area}} \quad (1)$$

where

"Inlet Area" is the gap at the lower wing leading edge 27 times the wing span; and "Critical Area" is smallest permissible gap between the wing sections times the wing span.

Thus, the wing sections 21, 26, fuselage 14, and end plate 25 form a duct, as shown in FIG. 3A, through which the air must flow. Two phenomena that must be considered in designing a supersonic duct (or gap) are swallowing of the bow shock wave and choking of the air flow. If the staggered wing sections are too close together, a shock wave will develop in front of and substantially enclose the leading edges 22, 27 of the wing sections 21, 26. Hence, the shock wave cannot be "swallowed" by the duct formed between the staggered wing sections and, accordingly, air flow therethrough is restricted. This results in an adverse increase in the drag forces acting on the staggered wing sections. However, if the staggered wing sections 21, 26 are spread too far apart, beneficial interference of the shock waves is precluded and the wing sections function independent of each other. Accordingly, proper proportioning of the critical area to the inlet area will enable the wing sections 21, 26 to "swallow" the bow shock wave and not "choke" under design conditions.

The isentropic area ratio which is used to determine the critical areas is expressed as follows:

$$A^*/A = \frac{1}{M} \sqrt{\frac{\gamma + 1}{2\left(1 + \frac{\gamma - 1}{2} M^2\right)} \left[\frac{n_m}{\frac{\gamma + 1}{2\,1 + \frac{\gamma + 1}{2} M^2} - 1 + n_m}\right]^{\frac{\gamma}{\gamma - 1}}} \quad (1)$$

M represents the Mach number;

γ(gamma) represents the specific heat ratio (Cp/Cv) of the air; and $n_m$ represents the adiabatic efficiency of the air.

Wing stagger, which is the longitudinal distance between the upper wing leading edge 22 and the lower wing leading edge 27 as depicted in FIG. 2, is a function of both the shock angle (α') and the established wing gap. For high speed flight conditions, the leading edge 27 of the lower wing section 26 should be located slightly behind the Mach wavelet produced by the leading edge 22 of the upper wing section 21, as shown in FIG. 2, to produce beneficial flow interference between wing sections 21, 26.

Figure 5:
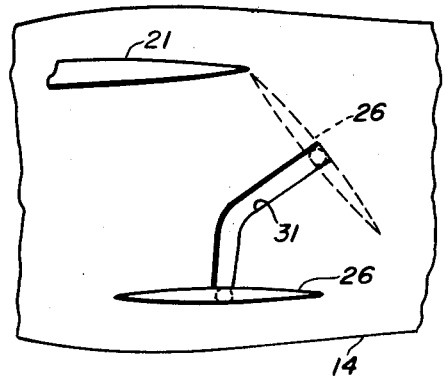
FIG. 5 is a view of the guide means for displacing the lower wing section.
Figure 6:
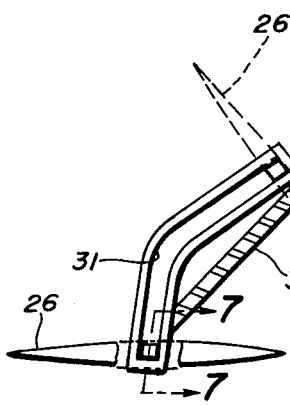
FIG. 6 is a view of a mechanism for displacing the lower wing section.
Figure 7:
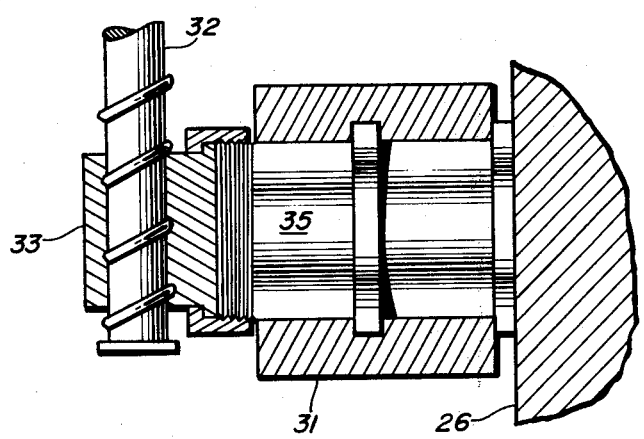
FIG. 7 is a cross-sectional view of FIG. 6 taken along line 7—7.

One means for producing rotational and translational displacements of the lower wing section 26 is generally shown in FIGS. 5 through 7 wherein cam type bearing element 35 is fixed to the lower wing structure 26 and configured to slide in an elongated bearing guide or raceway 30 which is positioned in the fuselage of the airplane. A jacking block 33 is connected to the cam bearing 35 and constructed to receive an elongated jack screw 32. Thus, upon proper command from a drive means 34, the rotating jack screw 32 causes the cam bearing 35 to move a predetermined direction in the bearing guide 31 to a preselected position. As shown in FIGS. 5 and 6, the bearing guide 31 includes adjacent oblique sections that cause the cam bearing 35 and wing section 26 to undergo both translational and rotational displacements. Other bearing guide configurations are possible to enable the lower wing section 26 to move in a completely horizontal mode to adjust the position of the lower wing leading edge 27 so that is slightly behind the leading shock wave produced by the leading edge 22 of the upper wing section 21. For example, a horizontal bearing guide portion may be provided in the bearing guide 31 to permit horizontal translations of the lower wing section 26.

Obviously many modifications and variations of the invention are possible in light of the above teachings. It is therefore to be understood that within the scope of the appended claims the invention may be practiced otherwise than as specifically described.

What is claimed is:

1. An airplane wing structure attached to an airplane fuselage having a forward end portion and a trailing end portion comprising:

upper and lower elongated wing sections, wherein the leading edge of the upper wing section is positioned on the fuselage forward of the leading edge of the lower wing section, and the upper wing section is supported from the fuselage in a fixed position; and means supporting the lower wing section from the fuselage to produce rotational and translational displacement of the lower wing section relative to the upper wing section wherein the lower wing section is capable of assuming configurations where the lower wing section may be aligned with its trailing edge lower than the upper wing section and its leading edge adjacent the trailing edge of the upper wing section for high lift low speed flight conditions, and wherein the lower wing section can be aligned substantially parallel with the upper wing section for higher speed flight conditions.

2. An airplane wing structure attached to an airplane fuselage having a forward end portion and a trailing end portion comprising:

upper and lower elongated wing sections, wherein the leading edge of the upper wing section is positioned on the fuselage forward of the leading edge of the lower wing section, and the upper wing section is supported from the fuselage in a fixed position; and means supporting the lower wing section from the fuselage including a bearing cam element secured to the lower wing section, an elongated bearing guide for the cam element located in the fuselage of the airplane, and drive means located in the fuselage of the airplane and connected to the cam element for driving the cam element and lower wing section can be positioned to align the lower wing section with its trailing edge lower than the upper wing section and its leading edge adjacent to the trailing edge of the upper wing section for high lift, low speed flight, and wherein the cam element and lower wing section can be positioned to align the lower wing section substantially parallel to the upper wing section for higher speed flight conditions.

3. The wing structure according to claim 2, wherein the bearing guide includes adjacent oblique sections so that the lower wing section is capable of translational and rotational displacements from a fixed position.

4. The wing structure according to claim 1, wherein the upper wing section and lower wing section are connected together at their distal ends by an end plate.

* * * * *